United States Patent Office 2,844,565
Patented July 22, 1958

2,844,565

AGGLOMERATES AND METHODS FOR MAKING

Donald W. Hayes, Akron, Ohio, assignor to The Goodyear Tire & Rubber Company, Akron, Ohio, a corporation of Ohio No Drawing. Application March 12, 1954
Serial No. 415,949

4 Claims. (Cl. 260—45.95)

This invention relates to a powdered vulcanization accelerator in a new and more useful form. More specifically it relates to methods for agglomerating a powdered accelerator and to the agglomerates so formed.

The use of powdered organic accelerators in the compounding of natural and synthetic rubber presents certain problems to the rubber goods manufacturer. For example, the finely divided nature of the accelerator causes it to be blown into the air during production operations such as milling. This loss of the accelerator represents an increase in the cost of production. Also, any finely divided powder which is blown into the air surrounding production operations results in the contamination of other materials. Then, too, certain of these accelerators create serious health hazards in production operations because once blown into the air surrounding production operations, they cause irritation to the skin and nasal passages of the workmen exposed to the contaminated air. In addition, the fine powder-like nature of the pigments makes uniform dispersion difficult since the pigments tend to form lumps and flakes which stick to or cake on the mill rolls, thus increasing the time and effort required to form an intimate and thorough dispersion of the pigment in the rubber.

Efforts have been made to reduce the objectionable features of the powdered accelerators by converting the finely divided pigment particles into some form of agglomerate. It has usually been found that, in order to form such agglomerates, some additive must be used with the powdered pigment if the agglomerate, once formed, is to be stable. The additives frequently are materials which may be objectionable when ultimately mixed into the rubber compound with which the accelerator is to be used. Still other additives produce agglomerates which are relatively cohesive and not free-flowing, with the result that such agglomerates do not lend themselves to normal handling and weighing procedures. Other additives employed for preparing agglomerated accelerators are used in such large amounts that the rubber chemist is required to work with an unnecessarily "diluted" accelerator. Other treatments provide accelerators in agglomerated form which do not disperse readily into the rubber during the milling operation. Still other treatments result in an agglomerate which is not sufficiently stable to maintain its agglomerated form while it is transported from the manufacturer to the user. All of these objections have been overcome by preparing the powdered accelerators in an agglomerated form according to the methods of this invention.

One object of this invention is to provide for the preparation of a powdered accelerator in an agglomerated form which will substantially eliminate the tendency of the accelerator to form dust which is blown into the surrounding air during storage, shipping, weighing, and processing operations. The use of these novel forms of accelerator results in a material saving to the manufacturer, the elimination of a source of contamination, and the elimination of a health hazard to which workmen handling such materials are exposed.

Another object of this invention is to provide for the preparation of the accelerator in an agglomerated form of such a nature that the individual particles of the agglomerate will hold together during normal handling operations and yet will disperse uniformly into and through the rubber during the milling operation. Still another object is to provide for the preparation of an agglomerated organic rubber vulcanization accelerator which disperses more rapidly into the rubber during milling than will the unagglomerated powdered accelerator itself.

Another object is to prepare an agglomerated accelerator which is not cohesive but is free-flowing.

Another object is to prepare an agglomerated organic accelerator with a minimum amount of diluent. Still another object is to prepare an agglomerated accelerator which contains no materials deleterious to the compounding of the rubber with which the accelerator is to be used.

In accordance with this invention, it has been found that these objects can be accomplished by mixing the accelerator with a minimum amount of a rubber latex of controlled plasticity under such conditions that the blending of the accelerator with the latex is completed before coagulation of the latex occurs.

The particular rubber accelerator to which this invention applies is mercaptobenzothiazyl disulfide.

The particular rubber latices which are employed in the practice of this invention are natural rubber latex, polychloroprene latex, polybutadiene latex, the latices of the rubbery copolymers of butadiene and styrene and the latices of the rubbery copolymers of butadiene and acrylonitrile. Of these, natural rubber latex and the latices of the rubbery copolymers of butadiene and styrene are preferred. The latex employed must have a plasticity not greater than 120 when measured according to A. S. T. M. method D927–49T using the large rotor at 212° F. It is preferred to employ latices having a Mooney plasticity of from 40 to 60.

In order to prevent the premature coagulation of the rubber latex when mixed with the powdered accelerator, the latex is treated with a volatile stabilizer or preservative, such as ammonia. This is necessary since the powdered accelerator usually contains a small amount of occluded acid which will cause premature coagulation of latex which does not contain a stabilizer. In addition to the volatile stabilizer the latex should contain an antioxidant, and preferably a non-discoloring antioxidant, in order to preserve the rubber content of the agglomerate during storage.

Representative of the volatile stabilizers which are used in the practice of this invention are ammonia and the readily volatile amines such as dimethyl amine and morpholine. Of these ammonia is preferred. The amount of stabilizer employed should provide at least 1% stabilizer by weight of the accelerator.

The antioxidants which are employed are those commonly used with natural or synthetic rubber latex such as phenyl beta naphthyl amine, octylated diphenyl amine, N,N'-di (beta naphthyl) para-phenylene diamine and the reaction product of acetone and aniline. It is preferred, however, that the antioxidant used be one which does not discolor the agglomerated accelerator. Representative of these non-discoloring antioxidants are the styrenated and alkylated phenols and the phenyl phosphites.

In the preparation of the agglomerate, it is preferred that a minimum amount of latex be employed for the reason that the users of the accelerator prefer to employ one which is as nearly chemically pure as possible and which contains a minimum amount of diluent. It has been found that the latex required to produce satisfactory agglomerates of the specific accelerators mentioned above should provide at least 4 parts by weight of rubber hydrocarbon per 100 parts by weight of the powdered accelerator. While satisfactory agglomerates can be produced using as much as 25 parts by weight of rubber hydrocarbon per 100 parts by weight of accelerator, it is preferred that from 4 to 10 parts by weight be used to minimize the dilution of the accelerator by the rubber hydrocarbon.

In the mixing of the latex with the powdered pigment, sufficient water is provided to furnish a water content of from 35 to 50% by weight of the total mix. In this form the mixture has a paste-like consistency which lends itself readily to the formation of agglomerates by means of any conventional type of pellet-forming apparatus such as a granulator, molding press, corrugated rolls or an extruder. The preferred method for forming the agglomerates is to extrude the paste-like mixture through a die provided with a plurality of small cylindrical holes. The mixture leaves the extruder in the form of strings, rods, or granules which are collected, preferably on a moving belt, and then dried. Excessively high drying temperatures are to be avoided in order to prevent discoloration of the agglomerate or melting of the accelerator. Temperatures in the range of from 100 to 125° F. have been found to be satisfactory.

During the drying operation the volatile stabilizer and the water present in the product are removed, leaving an agglomerate of the powdered accelerator containing the solids content of the latex as the only diluent of the otherwise pure accelerator.

Further details of the practice of this invention are set forth in the following examples which are to be interpreted as representative rather than restrictive of the scope of this invention:

*Example 1*

Three grams of a 28% aqueous ammonia solution and 60 grams of water were added to 22.7 grams of a latex prepared from 71% butadiene and 29% styrene. The latex contained 21.73% rubber hydrocarbon and 0.276% of a styrenated phenol antioxidant by weight. The rubber hydrocarbon content of the latex had a Mooney plasticity of 110 when tested according to A. S. T. M. method D 927-49T, using the large rotor at 212° F. This mixture was then added to 95 grams of mercaptobenzothiazyl disulfide. After thoroughly mixing the ingredients, the paste-like mixture was extruded and dried at 110° F.

*Example 2*

Three grams of a 28% aqueous ammonia solution and 70 grams of water were added to 22.4 grams of a polybutadiene latex. The latex contained 22.02% rubber hydrocarbon and 0.275% of a styrenated phenol antioxidant by weight. The rubber hydrocarbon content of the latex had a Mooney plasticity of 73. This mixture was then added to 95 grams of mercaptobenzothiazyl disulfide. After thorough mixing the paste-like mixture was extruded and dried at 110° F.

*Example 3*

Three grams of a 28% aqueous ammonia solution and 80 grams of water were added to 21.3 grams of a latex prepared from 71% butadiene and 29% styrene. The latex contained 23.17% rubber hydrocarbon and 0.288% of a styrenated phenol antioxidant by weight. The rubber hydrocarbon content of the latex had a Mooney plasticity of 47. This mixture was then added to 95 grams of mercaptobenzothiazyl disulfide. After thorough mixing the paste-like composition was extruded and dried at 115° F.

*Example 4*

Three grams of a 28% aqueous ammonia solution and 57 grams of water were added to 21.4 grams of a latex prepared from 71% butadiene and 29% styrene. The latex contained 23.17% rubber hydrocarbon and 0.288% of a styrenated phenol antioxidant by weight. The rubber hydrocarbon content of the latex had a Mooney plasticity of 47. This mixture was added to 95 grams of mercaptobenzothiazyl disulfide. After a thorough mixing the paste-like composition was extruded and dried at 110° F.

The agglomerated accelerators prepared according to Examples 1 through 4 formed stable, non-dusty, agglomerates which were free-flowing. Mixing the agglomerates with rubber on a mill and in a Banbury in accordance with normal practice showed that the agglomerates dispersed more rapidly and more uniformly into the rubber than did the dry powdered accelerators from which the agglomerates were made.

Thus, it will be seen that by following the practices of this invention it is possible to produce a free-flowing, stable, non-dusty, agglomerated accelerator containing only a minimum amount of diluent. The agglomerates themselves maintain their stability during storage and handling operations and yet disperse rapidly and uniformly into and through the rubber compound with which they are used.

While certain representative embodiments and details have been shown for the purpose of illustrating the invention, it will be apparent to those skilled in this art that various changes and modifications may be made therein without departing from the spirit or scope of the invention.

I claim:

1. The method for preparing an agglomerated compounding ingredient for rubber which comprises mixing mercaptobenzothiazyl disulfide with a latex containing a volatile stabilizer selected from the group consisting of ammonia, dimethyl amine, and morpholine and an antioxidant for the rubber portion of said latex, said latex being selected from the group consisting of natural rubber latex, polychloroprene latex, polybutadiene latex, the latices of the rubbery copolymers of butadiene and styrene, and the latices of the rubbery copolymers of butadiene and acrylonitrile, the mercaptobenzothiazyl disulfide being present in 100 parts by weight, the latex being present in an amount to provide from 4 to 10 parts rubbery hydrocarbon by weight per 100 parts by weight of mercaptobenzothiazyl disulfide, the volatile stabilizer being present in an amount to provide at least 1 part by weight per 100 parts by weight of mercaptobenzothiazyl disulfide, the total water content of the mixture ranging from 35 to 50% of the total weight of the mass, forming agglomerates of said mixture, drying the agglomerates to remove water and the volatile stabilizer and collecting the dried agglomerates.

2. The method according to claim 1 in which the agglomerates are formed by extruding the mixtre of mercaptobenzothiazyl disulfide, rubbery hydrocarbon, volatile stabilizer, antioxidant and water in the form of strings or rods.

3. The method according to claim 2 in which the volatile stabilizer is ammonia and the antioxidant is a styrenated phenol.

4. The method according to claim 3 in which the latex is a rubbery copolymer of butadiene and styrene.

References Cited in the file of this patent

UNITED STATES PATENTS

| | | |
|---|---|---|
| 2,555,068 | Van Veersen | May 29, 1951 |
| 2,640,088 | Glenn | May 26, 1953 |
| 2,647,887 | Goppel | Aug. 4, 1953 |